United States Patent
Barshefsky et al.

(10) Patent No.: US 6,385,609 B1
(45) Date of Patent: May 7, 2002

(54) SYSTEM AND METHOD FOR ANALYZING AND DISPLAYING TELECOMMUNICATIONS SWITCH REPORT OUTPUT

(75) Inventors: Alvin Barshefsky; Shao-Kuang Hu, both of Naperville; Scott Douglas Olmstead, Wheaton; Kirk K. Pegues, Forest Park; William Calvin Sand, St. Charles; Rickey Joseph Spiece, Naperville, all of IL (US); Shun-Chi Wu, Tokyo (JP); Chi Ying Yu, Westmont, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/298,756

(22) Filed: Apr. 23, 1999

Related U.S. Application Data

(60) Provisional application No. 60/083,167, filed on Apr. 23, 1998.

(51) Int. Cl.[7] ............................................... G06F 17/30
(52) U.S. Cl. ............................. 707/6; 707/3; 707/223; 379/111; 379/112.04
(58) Field of Search ........................ 348/14.11, 14.01; 370/244, 254, 535; 379/265, 134, 116, 15, 309, 9.03, 224, 112.06, 14, 2, 33, 111, 112.01, 112.04, 112.1; 455/252, 517; 709/223, 224; 707/3, 6

(56) References Cited

U.S. PATENT DOCUMENTS

| | | | | |
|---|---|---|---|---|
| 4,805,209 A | * | 2/1989 | Baker et al. | 379/96 |
| 4,935,956 A | * | 6/1990 | Hellwarth et al. | 379/112 |
| 5,181,239 A | * | 1/1993 | Jolissaint | 379/112 |
| 5,555,290 A | * | 9/1996 | Mcleod et al. | 376/112 |
| 5,999,525 A | * | 12/1999 | Krishnaswamy et al. | 379/112 |

* cited by examiner

Primary Examiner—Jean M. Corrielus

(57) ABSTRACT

A system and methods are provided for collecting, analyzing, and reporting data supplied on the report data stream of an electronic switching system or other generator of a report or log data stream or file. Local data storage facilities are provided to receive and store report data stream information for one or more switches. A centralized data storage and analysis facility receives the data collected by the local facilities. A parser parses the collected report data to select and reformat report items of interest according to predefined selection triggers. A post processing facility includes pattern identification and pattern classification components. The pattern identification component reads the parsed, selected report items and extracts a pattern comprising the selection triggers and function call addresses associated with each event. The pattern classification component determines whether the identified pattern for each event is old or newly encountered. If new, a new pattern identification is assigned and the pattern information is stored. If old, the pattern identification is retrieved from storage and associated with the event. The system provides a facility for users with subject matter expertise to associate a group of related patterns as a "problem." After post-processing, pattern and report information is imported into a database. A user interface, which may include a world-wide-web server and browser, is provided to display the analyzed information to the user. The system determines switch performance indices, including an Operational Risk index, which measures the risk of being unable to provide services from a switch.

24 Claims, 13 Drawing Sheets

| TABLE NAME | COLUMN NAME | NULL/NOT NULL | DATA TYPE |
|---|---|---|---|
| CODE_DEFINITION | | | |
| | GROUP_ID | NOT NULL | NUMBER |
| | CODE | NOT NULL | VARCHAR2(50) |
| | ALIAS | | VARCHAR2(50) |
| 610 | SHORT_DESC | | VARCHAR2(150) |
| | DESCRIPTION | | VARCHAR2(2000) |

*FIG. 6A*

| TABLE NAME | COLUMN NAME | NULL/NOT NULL | DATA TYPE |
|---|---|---|---|
| EVENT_CODE_SUM | | | |
| | LOC_ID | NOT NULL | NUMBER |
| | DATE_TIME | NOT NULL | DATE |
| | TYPE_ID | NOT NULL | NUMBER |
| 614 | CODE | NOT NULL | VARCHAR2(50) |
| | TOTAL_COUNT | NOT NULL | NUMBER |
| | ROP_ID | NOT NULL | NUMBER |

*FIG. 6C*

| TABLE NAME | COLUMN NAME | NULL/NOT NULL | DATA TYPE |
|---|---|---|---|
| EVENT_PATTERN_DETL | | | |
| | LOC_ID | NOT NULL | NUMBER |
| | DATE_TIME | NOT NULL | DATE |
| | TYPE_ID | NOT NULL | NUMBER |
| 616 | PATTERN_ID | NOT NULL | NUMBER |
| | MSG_SEQ | NOT NULL | NUMBER |
| | MODULE | | VARCHAR2(10) |
| | EVENT | | NUMBER |
| | DATA_1 | | VARCHAR2(100) |
| | DATA_2 | | VARCHAR2(100) |
| | DATA_3 | | VARCHAR2(100) |
| | DATA_4 | | VARCHAR2(100) |
| | DATA_5 | | VARCHAR2(100) |
| | DATA_6 | | VARCHAR2(100) |
| | DATA_7 | | VARCHAR2(100) |
| | DATA_8 | | VARCHAR2(100) |
| | DATA_9 | | VARCHAR2(100) |
| | MORE_DATA | | VARCHAR2(500) |
| | TOTAL_COUNT | NOT NULL | NUMBER |
| | ROP_ID | NOT NULL | NUMBER |

*FIG. 6E*

| TABLE NAME | COLUMN NAME | NULL/NOT NULL | DATA TYPE |
|---|---|---|---|
| EVENT_PATTERN_SUM | | | |
| | LOC_ID | NOT NULL | NUMBER |
| | DATE_TIME | NOT NULL | DATE |
| | TYPE_ID | NOT NULL | NUMBER |
| 618 | PATTERN_ID | NOT NULL | NUMBER |
| | TOTAL_COUNT | NOT NULL | NUMBER |
| | IS_FIRST_TIME_IN_OFFICE | | VARCHAR2(1) |
| | IS_FIRST_TIME_IN_SITE | | VARCHAR2(1) |
| | IS_FIRST_TIME_IN_NETWORK | | VARCHAR2(1) |
| | ROP_ID | NOT NULL | NUMBER |

*FIG. 6F*

| TABLE NAME | COLUMN NAME | NULL/NOT NULL | DATA TYPE |
|---|---|---|---|
| LOCATION | | | |
| | LOC_ID | NOT NULL | NUMBER |
| | REGION | NOT NULL | VARCHAR2(20) |
| | APPLICATION | NOT NULL | VARCHAR2(10) |
| 620 | COUNTRY | NOT NULL | VARCHAR2(20) |
| | CUSTOMER | NOT NULL | VARCHAR2(30) |
| | SITE | NOT NULL | VARCHAR2(20) |
| | OFFICE | NOT NULL | VARCHAR2(20) |
| | OFFICE_TYPE | NOT NULL | VARCHAR2(1) |

*FIG. 6G*

| TABLE NAME | COLUMN NAME | NULL/NOT NULL | DATA TYPE |
|---|---|---|---|
| LOCATION_MAP | | | |
| | SWITCH | NOT NULL | VARCHAR2(30) |
| 622 | LOC_ID | NOT NULL | NUMBER |

*FIG. 6H*

| TABLE NAME | COLUMN NAME | NULL/NOT NULL | DATA TYPE |
|---|---|---|---|
| MSG_GROUP | | | |
| | GROUP_ID | NOT NULL | NUMBER |
| 624 | DESCRIPTION | NOT NULL | VARCHAR2(30) |

*FIG. 6J*

| TABLE NAME | COLUMN NAME | NULL/NOT NULL | DATA TYPE |
|---|---|---|---|
| MSG_GROUP_TYPE | | | |
| | GROUP_ID | NOT NULL | NUMBER |
| | CATEGORY | NOT NULL | VARCHAR2(30) |
| | TYPE_ID | NOT NULL | NUMBER |
| 626 | WEIGHT | NOT NULL | FLOAT(126) |

*FIG. 6K*

| TABLE NAME | COLUMN NAME | NULL/NOT NULL | DATA TYPE |
|---|---|---|---|
| MSG_TYPE | | | |
| | TYPE_ID | NOT NULL | NUMBER |
| | MSG_KEY | NOT NULL | VARCHAR2(30) |
| 628 | DESCRIPTION | NOT NULL | VARCHAR2(30) |

*FIG. 6L*

| TABLE NAME | COLUMN NAME | NULL/NOT NULL | DATA TYPE |
|---|---|---|---|
| NORMALITY | | | |
| | LOC_ID | NOT NULL | NUMBER |
| | DATE_TIME | NOT NULL | DATE |
| | TYPE_ID | NOT NULL | NUMBER |
| 630 | TOTAL_COUNT | NOT NULL | NUMBER |

*FIG. 6M*

| TABLE NAME | COLUMN NAME | NULL/NOT NULL | DATA TYPE |
|---|---|---|---|
| OFFICE_SU | | | |
| | LOC_ID | NOT NULL | NUMBER |
| | DATE_TIME | NOT NULL | DATE |
| | SU | NOT NULL | VARCHAR2(20) |
| 632 | IS_RETROFIT | | VARCHAR2(1) |
| | LAST_DATE | | DATE |
| | ASSERT_DEF_GROUP | | NUMBER |
| | ROP_ID | NOT NULL | NUMBER |

*FIG. 6N*

| TABLE NAME | COLUMN NAME | NULL/NOT NULL | DATA TYPE |
|---|---|---|---|
| PATTERN_CODE | | | |
| | PATTERN_ID | NOT NULL | NUMBER |
| | SEQ | NOT NULL | NUMBER |
| | TYPE_ID | NOT NULL | NUMBER |
| 636 | CODE | NOT NULL | VARCHAR2(50) |
| | ADDRESSES | NOT NULL | VARCHAR2(200) |

*FIG. 6Q*

| TABLE NAME | COLUMN NAME | NULL/NOT NULL | DATA TYPE |
|---|---|---|---|
| PATTERN_HISTORY | | | |
| | PATTERN_ID | NOT NULL | NUMBER |
| | LOC_ID | NOT NULL | NUMBER |
| 638 | TIME_FIRST_OCCUR | NOT NULL | DATE |

*FIG. 6R*

| TABLE NAME | COLUMN NAME | NULL/NOT NULL | DATA TYPE |
|---|---|---|---|
| REPORT_AVE | | | |
| | LOC_ID | NOT NULL | NUMBER |
| | YEAR_MONTH | NOT NULL | VARCHAR2(10) |
| | WEEK_DAY | NOT NULL | NUMBER |
| 642 | DAY_HOUR | NOT NULL | NUMBER |
| | TYPE_ID | NOT NULL | NUMBER |
| | NUM_HOURS | NOT NULL | FLOAT(126) |
| | AVERAGE | NOT NULL | FLOAT(126) |

*FIG. 6T*

| TABLE NAME | COLUMN NAME | NULL/NOT NULL | DATA TYPE |
|---|---|---|---|
| REPORT_DETL | | | |
| | LOC_ID | NOT NULL | NUMBER |
| | DATE_TIME | NOT NULL | DATE |
| | TYPE_ID | NOT NULL | NUMBER |
| 644 | COMPONENT | NOT NULL | VARCHAR2(20) |
| | DURATION | NOT NULL | FLOAT(126) |
| | TOTAL_COUNT | NOT NULL | NUMBER |
| | PERCENTAGE | NOT NULL | FLOAT(126) |
| | ROP_ID | NOT NULL | NUMBER |

*FIG. 6U*

| TABLE NAME | COLUMN NAME | NULL/NOT NULL | DATA TYPE |
|---|---|---|---|
| REPORT_SUM | | | |
| | LOC_ID | NOT NULL | NUMBER |
| | DATE_TIME | NOT NULL | DATE |
| | TYPE_ID | NOT NULL | NUMBER |
| 646 | DURATION | NOT NULL | FLOAT(126) |
| | TOTAL_COUNT | NOT NULL | NUMBER |
| | PERCENTAGE | NOT NULL | FLOAT(126) |
| | ROP_ID | NOT NULL | NUMBER |

*FIG. 6V*

| TABLE NAME | COLUMN NAME | NULL/NOT NULL | DATA TYPE |
|---|---|---|---|
| ROP_INFO | | | |
| | ROP_ID | NOT NULL | NUMBER |
| | ROP_FILE | NOT NULL | VARCHAR2(160) |
| | NUM_EVENT_CODE_DETL | | NUMBER |
| 648 | NUM_EVENT_CODE_SUM | | NUMBER |
| | NUM_EVENT_PATTERN_DETL | | NUMBER |
| | NUM_EVENT_PATTERN_SUM | | NUMBER |
| | NUM_OFFICE_SU | | NUMBER |
| | NUM_REPORT_DETL | | NUMBER |
| | NUM_REPORT_SUM | | NUMBER |
| | NUM_ROP_SCOPE | | NUMBER |
| | IMP_NUM_EVENT_CODE_DETL | | NUMBER |
| | IMP_NUM_EVENT_CODE_SUM | | NUMBER |
| | IMP_NUM_EVENT_PATTERN_DETL | | NUMBER |
| | IMP_NUM_EVENT_PATTERN_SUM | | NUMBER |
| | IMP_NUM_OFFICE_SU | | NUMBER |
| | IMP_NUM_REPORT_DETL | | NUMBER |
| | IMP_NUM_REPORT_SUM | | NUMBER |
| | IMP_NUM_ROP_SCOPE | | NUMBER |
| | IMPORT_ID | NOT NULL | NUMBER |

*FIG. 6W*

| TABLE NAME | COLUMN NAME | NULL/NOT NULL | DATA TYPE |
|---|---|---|---|
| ROP_SCOPE | | | |
| | LOC_ID | NOT NULL | NUMBER |
| | ROP_DATE | NOT NULL | DATE |
| | START_TIME | NOT NULL | DATE |
| 650 | END_TIME | NOT NULL | DATE |
| | DURATION | NOT NULL | FLOAT(126) |
| | ROP_ID | NOT NULL | NUMBER |

*FIG. 6X*

| TABLE NAME | COLUMN NAME | NULL/NOT NULL | DATA TYPE |
|---|---|---|---|
| SWITCH_INDEX | | | |
| | LOC_ID | NOT NULL | NUMBER |
| | DATE_TIME | NOT NULL | DATE |
| | TYPE_ID | NOT NULL | NUMBER |
| 652 | INDEX_VALUE | NOT NULL | FLOAT(126) |
| | BASE_VALUE | NOT NULL | NUMBER |

*FIG. 6Y*

```
710↘                    ┌724
 +++ KHR2 98-03-22 13:16:11 |DCF| 4506 #025702 >
 A INIT SM=15,0 LVL=RPI OSDSM EVENT=|57918| COMPLETED
 DEF-CHK-FAIL=30765}~716              ↖714
 SW-ERR FAILING-ADDR=H342f93e SM-MODE=NORMAL TIME=15:41:0
 PROCESS: BG=706,189,RPI CM=NONE, FG=NONE,,
 SPP-COUNTS=0,0   AUD-SCHED=NONE

END OF REPORT #025702 ++-

712↘                    ┌724
 +++ KHR2 98-03-22 13:16:14 |DCF| 4508 #025703 >        ┌714
 A REPT SM=15 STACK TRACE ENV=OSDSM SRC=DCF EVENT=|57918|
 USER:
 718~┌0342f93e 02a70b9e 032d0618 032cc73c 02a6fbd8 02b7ea0c
     └02b7f3b2 0148ebc2
 RCVY:
 SYS:

END OF REPORT #025703 ++-
```

| OFFICE | DATE | MESSAGE CLASS | CODE | FREQUENCY | INTERNAL ID NUMBER |
|---|---|---|---|---|---|
| KHR2 | 03/22/98 | DCF | 30765 | 16 | 186238912 |
|  |  | 724 | 716 |  | 722 |

| 102 | DCF | 30765 | 0342f93e:02a70b9e:032d0618:032cc73c:02a6fbd8:02b7ea0c:02b7f3b2:0148ebc2 | 1 | DCF:30765 | 186238912 |
|---|---|---|---|---|---|---|
|  | 724 | 716 | 718 | | 724  716 | 722 |

*FIG. 7C*

SYSTEM AND METHOD FOR ANALYZING AND DISPLAYING TELECOMMUNICATIONS SWITCH REPORT OUTPUT

This application claims benefit of Provisional Applicaton No. 60/083,167 filed Apr. 23, 1998.

FIELD OF THE INVENTION

The present invention relates to telephone switching systems, and more particularly to systems and methods for analyzing and displaying switching-system-produced output streams containing information regarding the operation and internal state of the switching system.

BACKGROUND OF THE INVENTION

Modern telephone switching systems are large-scale, highly complex systems incorporating one or more switching elements cooperatively controlled and supervised by suitable computing means. One commercial exemplar of a modern telephone switching system is the 5ESS® ELECTRONIC SWITCHING SYSTEM, a product of Lucent Technologies Inc., 600 Mountain Avenue, Murray Hill, N.J. 07974. The 5ESS electronic switch is a distributed switching system, in that the switching capabilities of the system may be distributed among a plurality of switching modules, and the control, supervision, and administration capabilities are distributed among a plurality of computing facilities operating in cooperation. The 5ESS electronic switch is described in The 5ESS Switching System, AT&T Technical Journal, Vol. 64, No. 6, Part 2 (July–August 1985). Each of the computing facilities in the 5ESS electronic switch includes appropriate computer programs to achieve the desired operation of the associated switching elements and other functional components of the switching system, and interconnecting transmission facilities, signaling systems, wired subscriber lines, and cellular service systems. These programs are extensive.

Although the 5ESS electronic switch is engineered to provide highly reliable service, problems do occur. Rapid recognition of the sources of new problems, and current levels of previously reported problems, are critical to understanding the current state of the switching system (or network thereof) so that prompt action can be taken to resolve such problems.

The 5ESS electronic switch provides a report data stream containing time-stamped information regarding the current state and recent operation of the switching system. The report data stream provides, among other functions, the primary means by which the activity of the switch may be communicated to persons responsible for ensuring proper operation of the switching system and for correcting any problems which may occur. Thus, the report data stream may be considered to be the "voice of the switch."

The report data stream includes:

a transcript of interactions between operating personnel and the switching system;

traffic reports, reports describing the state of switch hardware, reports of automatic actions taken by the switch, routine or scheduled diagnostic reports, other similar reports reflecting the routine operation of the switching system; and reports of various types indicating non-routine events, abnormal conditions, errors, or other indications of trouble within the switching system.

Historically, the report data stream has been supplied via a standard interface, such as a serial port, to a "read-only" printer ("ROP"). Accordingly, the report data stream is sometimes referred to using the acronym "ROP", and reports therefrom are referred to as "ROP reports".

When a problem occurs, many possible reports or combinations of reports may be produced by the switching system. Analyzing the root cause of the problem requires identifying the "back-trace" or thread of reports that lead up to or result from the problem. However, the report data stream output is voluminous. For a typical 5ESS electronic switch in operation in a real-world application, the report data stream may comprise in excess of 15 000 individual messages and may be as large as 4 to 5 megabytes per day. Output of this volume, when produced on human-readable media, is difficult to use for problem identification. This difficulty is compounded because multiple switches are now often located in a single building or complex, and because service providers desire to manage large numbers of switches from centralized management centers. Accordingly, in modern practice, the report data stream from a switch is often recorded electronically (e.g., stored in a computer), rather than printed, and the report data streams from several switches are sometimes collected and recorded at a central location.

Persons needing to review the electronically stored report data stream output may use the resources of a computer, or other suitable means, which allow the user to search for and display reports of interest. It is generally easier to search and display the electronically stored report data stream output than it is to use report data stream output fixed in conventional media, such as paper. A system for collecting and recording report data stream output streams from several switching systems is commercially available from Lucent Technologies Inc. under the designations OMP and MFOS; and from ADC Telecommunications Inc., Winchester, Mass., under the designation METRICA.

Although the report data stream output may be stored, searched, and displayed electronically, it nonetheless remains difficult for persons examining the output to (a) understand the significance of a particular report instance; or (b) identify or select those report instances which may be important from among the large quantity of data collected. It is difficult to understand the significance of a particular report instance—that is, a reported event—because, when viewed in isolation, there is no way for a person to determine the frequency of the event in a switch or the distribution of the event across diverse switch installations, locations and applications.

It is difficult to identify or select "important" report instances because doing so requires a determination of whether the report corresponds to a "new" problem or a previously reported problem, and, if the latter, which previously reported problem.

Current methods of problem detection from the switch report data stream disadvantageously involve manual analysis of individual reports or small combinations of reports. Different events within the switch may be reported using the same reporting mechanism, and hence when reported may appear superficially to be the same or a related event. Thus, current methods require that personnel analyzing the report have extensive subject-matter expertise, and apply anecdotal knowledge regarding previously reported problems.

Moreover, events appear in the report data stream of each switch approximately in the sequence in which they occur, and the report data streams of the switches are separately maintained. Accordingly, there has been no way to establish and display meaningful correlations or patterns among reported events occurring in a single switch, events occurring in a group of related switches, events occurring in switches directed to the same application, and events occurring across the installed base of switches or releases of generic software.

Although the problems of the prior art are discussed above in the context of the report data stream produced by the 5ESS electronic switch, a particular commercial product, it is believed that users and manufacturers of other telephone switching systems may experience similar problems. It is believed that many other telephone switching systems, including those of other manufacturers, produce one or more data streams for reporting to network operators information regarding problems or abnormal events, although the format and content of the reports may differ.

SUMMARY OF THE INVENTION

The disadvantages of the prior art are overcome by a system and method according to the present invention for automatically analyzing and displaying switch report information. In accord with the invention, there is provided a system and methods for storing and retrieving of switch report data, reading and "processing" of the switch report data, organizing and storing the processed information, identifying and classifying patterns in the report data, further classifying patterns into unique problems, and viewing the resulting information.

According to an aspect of the invention, the system and/or associated method acquire switch report information from one or more switching systems and identify therefrom unique reports, patterns or classifications of reports, or problems indicated by such reports. According to another aspect of the invention, the system and/or associated method analyze switch report information to determine whether a report contained therein corresponds to or is equivalent to a report, pattern, or problem which has previously been identified. According to a further aspect of the invention, the system and/or associated method analyze switch report information from a plurality of switches to determine correlations among reports, patterns, or problems, and make available for display to the user switch report information including such correlations. Advantageously, the correlations may span time, space (that is, multiple switches, networks of switches, or other groupings of switches), application type, and software version.

BRIEF DESCRIPTION OF THE DRAWINGS

A more complete understanding of the invention may be obtained from the following detailed description of the preferred embodiments of the invention, taken in conjunction with the drawings, in which:

FIGS. 6a, 6c, 6e–6h, 6j–6n, and 6q–6r, and 6t–6y are tables showing record layouts for constructing a database for use in conjunction with the system of FIG. 1;

FIG. 7a depicts two sample reports which might appear in the switch report data stream; the figure is provided to assist the reader in understanding how data from the report is transformed during parsing;

FIG. 7b depicts a sample entry from a message file produced by the parser of FIG. 3;

FIG. 7c depicts a sample entry from a stack frame file produced by the parser of FIG. 3.

DETAILED DESCRIPTION OF THE PREFERRED EMBODIMENTS

Figure 1:
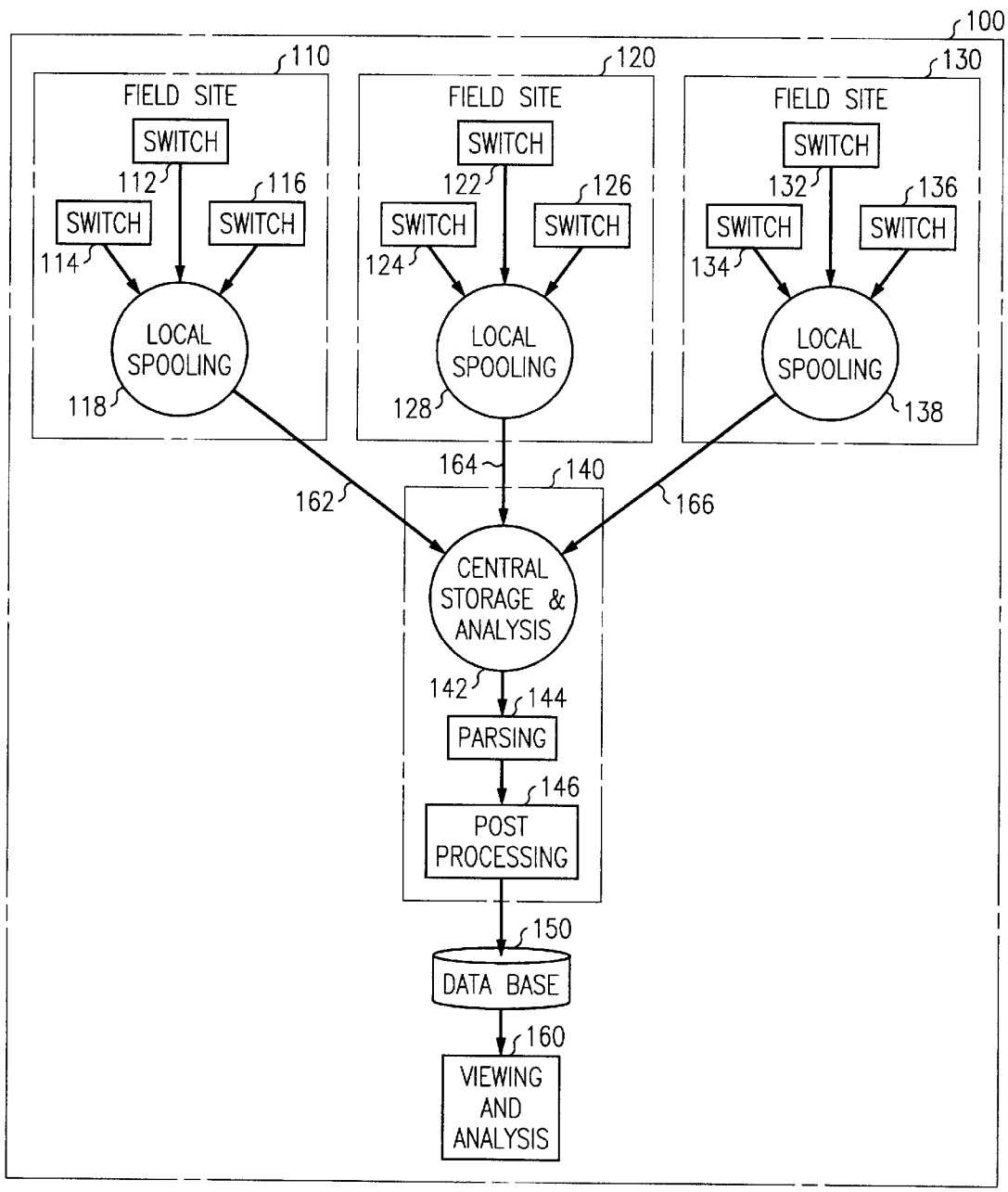
FIG. 1 is a simplified block diagram showing the overall architecture of a system and method for switch report data analysis and display arranged according to the present invention.
Figure 3:
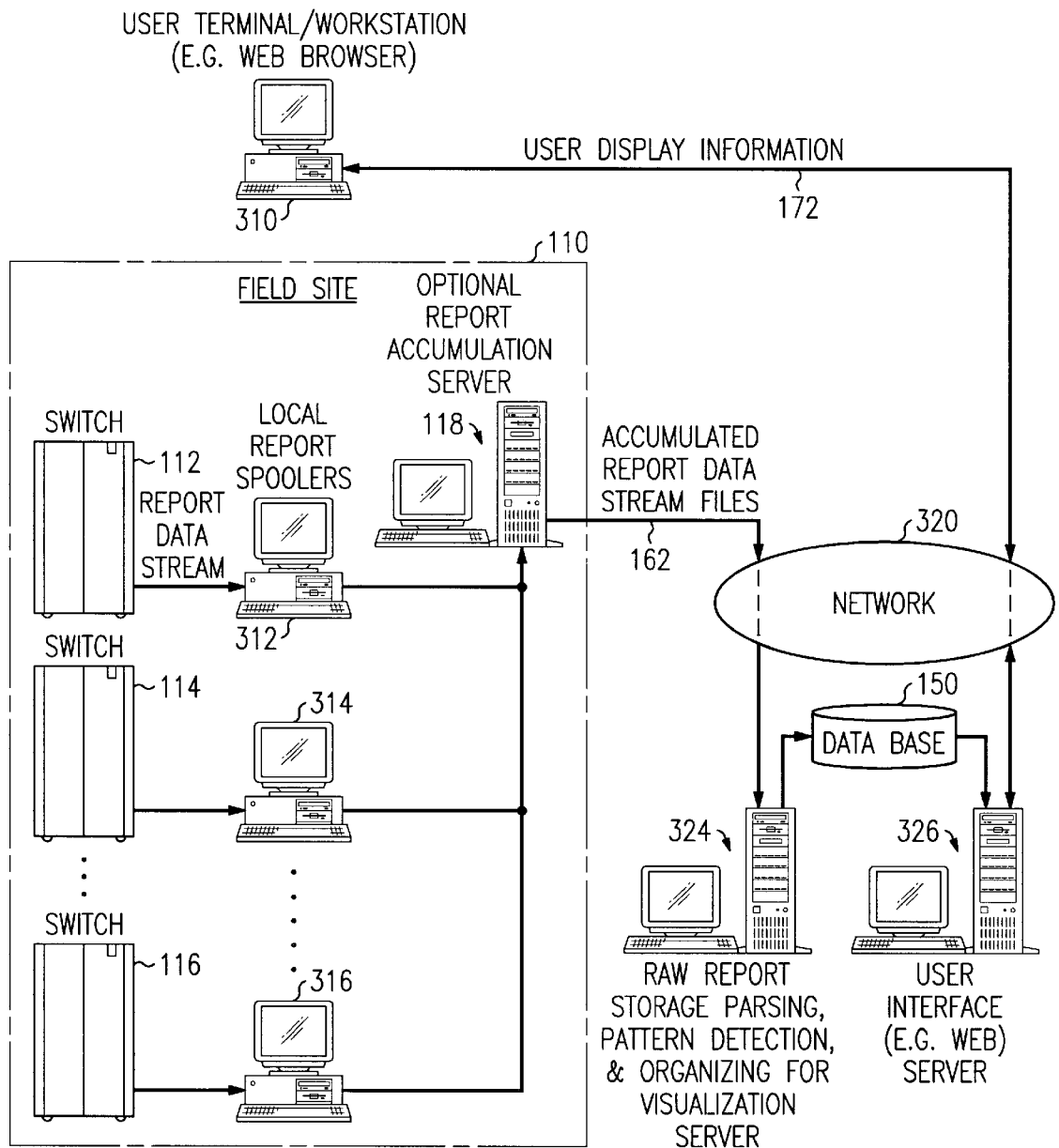
FIG. 3 is a block diagram showing the organization of the system of FIG. 1, including the flow of switch report information from switches producing such information through processing means for analyzing the information to a user terminal or workstation for requesting and displaying such information.

FIG. 1 is a simplified block diagram showing the overall architecture of a preferred embodiment of a system 100 and method for switch report data analysis and display arranged according to the present invention. FIG. 3 is a block diagram showing the organization of the system 100 of FIG. 1, including the flow of switch report information from switches (e.g., 112, 114, 116) producing such information through processing facilities 324 (see also 140, and 150 of FIG. 1) for analyzing the information to a user terminal or workstation 326 for requesting and displaying such information. As best seen in FIGS. 1 and 3, at least one telephone switching system ("switch") 112–116, 122–126, and 132–136 is provided at one or more field sites 110, 120, and 130, or switch installation locations. Spooling devices 312, 314, and 316 are provided to acquire and record the report data stream from each switch. Preferably, "local spooling" facilities 118, 128, and 138 are provided at each field site 110, 120, and 130 for recording and aggregating or accumulating the report data stream for all switches at the site. The report data is preferably transmitted over suitable data transmission paths 162, 164 and 166, shown generally as network 320, to a central report data storage and analysis facility 324, 140, 150. The central report data storage and analysis facility 324, 140, 150 may be located remotely with respect to any and all field sites and/or switching systems. If local spooling facilities 118, 128, 138 are not provided at the field sites, the report data for each switch may be independently transmitted to the central report data storage and analysis facility 324, 140, 150.

The local spooling facilities 118, 128, and 138 and the central report data storage and analysis facility 324, 140, 150 may be implemented using any suitable computers having sufficient processing and data storage capacities. For example, these computers could be "workstation" computers or networks thereof, which are generally commercially available from Sun Microsystems, Inc., and other suppliers. As is known in the art, the size and capacity of such computers may be selected based on the amount of data to be processed and stored, and therefore these parameters would depend at least in part on the number of switches to be serviced by each computer. For a network of 20 5ESS electronic switches, the local spooling means 118, 128, 138 may be implemented using a SPARC-10 server commercially available from Sun Microsystems, and the central analysis and storage facility 324, 140, 150 may be implemented using an ULTRA 2 CREATOR computer, which is also commercially available from Sun Microsystems. However, other computer systems or storage facilities could also be used.

The central storage and analysis facility 324, 140, 150 preferably stores switch report data, in approximately raw form, for a sizable number of switches, and corresponding to a lengthy interval of time. This aids persons who are attempting to analyze a problem by providing a larger universe of switch operating data from which patterns or classifications of problems may be detected.

In addition to storing switch report data, the central storage and analysis facility 324, 140, 150 preferably operates on the data by applying, in turn, a parsing operation, performed by parsing facility 144 (FIG. 1), and a post-processing operation, performed by post-processing facility 146 (FIG. 1). In the parsing operation the switch report data is scanned to identify particular switch reports which may be of interest in switch problem resolution, and therefore should be further analyzed. The report data stream contains some reports, such as traffic reports, which indicate only routine operation, and these need not be further analyzed.

Accordingly, the parser 144 selects for further analysis reports corresponding to any of a number of "triggers" listed below. Associated with each trigger report type are criteria used to determine which instances of the report are selected for analysis. Despite the presence of a report which is among the types of reports which generally may trigger selection by the parser, the parser may nonetheless filter out the report if it does not meet particular selection criteria associated with that report type. For example, a report may not be selected if information contained therein indicates the report lacks information needed to analyze a problem, or if the report indicates a condition of only superficial importance. Also associated with each trigger report type is a set of report fields which are used by the parser and later analysis steps to classify the report instances that were selected. Classification allows related reports to be grouped. The following is a list of switch report data stream report types which may be selected by the parser for further analysis, including the criteria by which such reports are filtered and classified:

(a) Alarm: an alarm is an indication of an event in the switch, or in the environment, which may require corrective action. Alarms fall into categories reflecting their level or severity—minor, major, or critical. Major and critical alarms report events which seriously affect service. Events causing major alarms include, for example, failure of the processor in the switch Administrative Module, failure of a disk file controller, failure of a switching module, operation of a power supply fuse, operation of fire suppression or water removal pumps, transmission equipment failure, failure of a CCITT No. 7 signaling link set, and duplex failure of a Switching Module controller. An event causing a minor alarm includes, for example, a carrier group alarm. The level of the alarm is used as the classification field. Reports indicating minor, major, and critical alarms are admitted through the filtering step.

(b) Assert (message classes DCF or ASRT): Asserts, also known as defensive checks, are small segments of code within programs or processes that check the validity of data during system operation. A code indicating the type of assert is used as the classification field. Assert reports are admitted through the filter if a valid numeric assert code is present, an indication of the processor from which the assert was generated is present (e.g., the administrative module or a switching module), and an event number is supplied.

(c) Craft Assert (message class CFA): An assert that requires a manual action for resolution is referred to as a craft assert. A code indicating the type of assert is used as the classification field. Craft Assert reports are admitted through the filter if a valid numeric assert code is present, an indication of the processor from which the assert was generated is present (e.g., the administrative module or a switching module), and an event number is supplied.

(d) RTA Assert (message class LDCF): An RTA Assert reports a defensive check failure which occurred in the routing and termination allocation software during routing. Codes indicating the type of error and the cause of the error are used to form the classification field. RTA Assert reports are admitted through the filter if the error code and cause code are present, an indication of the processor from which the assert was generated is present (e.g., the administrative module or a switching module), and an event number is supplied.

(e) Audit (message classes LAUDIT, AUDT, AUDTFST or AUDTMON): An Audit report is produced when audit software detects inconsistency or another unexpected state in various data structures used by the switch operating software. An alphabetic audit identity code and an error code are used to form the classification field. Audit reports are admitted through the filter if the alphabetic audit code and the error code are present, an indication of the processor from which the assert was generated (e.g., the administrative module or a switching module) is provided, and an event number is supplied.

(f) Initialization (message class: SINIT or INT) and Interrupt (message class: LHLIN or INT): An Initialization report is produced to report the impact of a recovery operation in a switching module. An Interrupt report is produced to report that an interrupt has occurred. An initializations is often performed as recovery operation when an interrupt has occurred. A hardware trigger or software stimulus code, and an error source code are used to form the classification field. Initialization and interrupt reports are admitted through the filter if a hardware trigger code or software stimulus code exists, an error source code is provided, an indication of the processor (e.g., Administrative Module or Switching Module) from which the report originated is present, an event number is supplied, software and hardware levels are specified, and a termination state is provided.

(g) MDII (message class: MDII): An MDII reports a machine-detected interoffice irregularity in the communications between two switches over a trunk; some of these reports are protocol errors. An MDII type code and a signaling type code are used to form the classification field. MDII reports are admitted through the filter if an MDII type code, a signaling type code, and a signaling protocol are provided, an indication of the processor (e.g., Administrative Module or Switching Module) from which the report originated is present, an equipment number (TEN, DEN or PLTEN), trunk group number, trunk group member number, trunk group size, number of OOS trunks, call direction, and service code parameters are supplied.

(h) PRM (message class: N/A): A PRM is a processor recovery message and is produced as the result of an initialization. The PRM status code (field 2) is used to form the classification field. PRM reports are admitted through the filter if an active administrative module computation unit is identified, the PRM status is provided with PRM class='F'; and a function code exists, data area, and DMERT hardware status is supplied.

(i) SPP (message class: LSPPIN): An SPP is a single process purge message and indicates a level of recovery action taken as a result of an interrupt. The trigger code is used to form the classification field. SPP reports are admitted through the filter if processor data, an event number, and an SM initialization level are provided.

(j) LPSIU (message class: LPSIU): LPSIU messages are error reports from the packet switch interface unit indicating the problem reason and the recovery action taken. The SM number is used to form the classification field. LPSIU reports are admitted through the filter if SM number, the LPSIU unit ID, the LPSIU reason code, and the recovery action are provided.

(k) PSUPH—Path Removed (message class: MTCE): This is a path removed message from the packet switch protocol handler. The PSUPH code is used to form the classification field. PSUPH reports are admitted through the filter if the SM number, PH equipment number, channel group number, MATE SM number, and Reason code are provided.

(l) SM—Restored (message class: SMCONFG): This message indicates that a particular piece of equipment within a switching module has been restored to service. The SM number is used to form the classification field. SM-Restored messages are admitted through the filter if the SM number, the equipment number, the restored reason code, and the restored status code are provided.

(m) SM—Removed (message class: SMCONFG): This message indicates that a particular piece of equipment within a switching module has been removed from service. The SM number is used to form the classification field. SM-Removed messages are admitted through the filter if the SM number, the equipment number, the removed reason code, and the removed status code are provided.

(n) SM Diagnosis—STF (message class: SMCONFG): This message indicates that some test failed during routine or on-demand switching module diagnostics. The SM number is used to form the classification field. SM Diagnosis messages are admitted through the filter if an SM number, an equipment number, a PH phase number, a segment number, a test number, and mismatch data are provided.

(o) MCTSI Removed (message class: MCTSI): The MCTSI Removed message indicates that the module control time slot interchange unit was removed from service. The MCTSI RMV code is used as the classification field. MCTSI RMV messages are admitted through the filter if an MCTSI code, MCTSI SM unit number, MCTSI unit number, event number, and a reason code are supplied.

(p) PTRACE (message class: PTC): This is a Program Trace message which indicates the file name and certain trace data. The file name is used to form the classification field. All PTRACE messages are admitted through the filter.

(q) Overload (message class: OVRLD): An overload message is produced when a resource overload condition occurs. The SM number is used to form the classification field. Overload messages are admitted through the filter if the SM number, the real-time overload status, an indication of the resource that is overloaded, and the control that is currently in effect are present.

(r) Route Overload (message class: RTOVRLD): The Route Overload message is produced when a particular trunk group is in an overload condition. The type of overload condition is indicated in the report. The route name is used to form the classification field. Route Overload messages are admitted through the filter if a route name (trunk group number) and route condition are provided.

(s) Route Blockage (message class: RTBLK): The Route Blockage message is produced when a particular trunk group is in a blocked condition. The type of blocked condition is indicated in the report. The route name is used to form the classification field. Route Blockage messages are admitted through the filter if a route name (trunk group number) and route condition are provided.

(t) Showering Line (message class: LSHOWER): The Showering Line report is produced when customer premises equipment continuously and rapidly transitions between off-hook and on-hook conditions. Equipment name is used to form the classification field. The Showering Line report is admitted through the filter if the equipment name, equipment number, SM number, line action, line status, result status, and directory number are present.

(u) LISLU (message class: LISLU): The LISLU report is produced when an integrated services line unit recover action occurs. The report indicates the line unit, the problem condition, and the recovery action taken. The line unit identification is used to form the classification field. LISLU reports are admitted through the filter if the line unit, line unit ID, switching module number, line condition, trouble type, event code, line error type, and recovery action are present.

(v) Carrier Group (message class: CG): The CG message reports a carrier group alarm. The CGA source name is used as the classification field. CG messages are admitted through the filter if the CGA source name, CGA source ID, switching module number, and CGA report reason are present.

(w) QLPS (message class: MTCE): The QLPS message is produced when there is a change in state (e.g., in-service, out-of-service, etc.) in the quad-link packet switch unit. The message class and QLPS identifier are used as the classification field. QLPS messages are admitted through the filter if the QLPS identification and status are present.

(x) QPH (message class: MTCE): The QPH message is produced when there is a change in state (e.g., in-service, out-of-service, etc.) in the quad packet handler. The message class and the QPH identifier are used as the classification field. QPH messages are admitted through the filter if the QPH identification and a report reason are provided.

(y) Core (message class: CORE): The Core message is produced when an error occurs in the communication link between the communication module and a switching module. The core action code is used as the classification field. Core messages are admitted through the filter if a core action, core unit name, core member number, event number, core error, and core time are supplied.

(z) Off-Normal Condition (message class: LOFFNRM): The Off-Normal Condition report is produced when any processor is in any state other than the normal state. The identification of the off-normal processor is used to form the classification field. Off-Normal Condition messages are passed through the filter if the off-normal processor identification and off-normal condition codes are present.

(aa) REX-SUM (message class: REX): The REX-SUM report is a summary of the results of certain "routine execute" diagnotics. The REX result is used to form the classification field. REX-SUM messages are admitted through the filter if the REX result, REX unit, REX unit number, REX time, and REX state are present.

(bb) REX-DGN (message class: REX): The REX-DGN report provides the results of diagnostic procedures for certain peripheral devices. The REX circuit type result is used to form the classification field. REX-DGN reports are admitted through the filter if the REX circuit type is supplied, and the REX-not-started, REX-ATP, REX-STF, REX-CATP, and REX-NTR parameters are present.

The aforementioned list of report types, filter criteria, and classification criteria are suitable for use with the 5ESS switching system. However, other report types, filter criteria, and classification criteria may be appropriate for use with other switching systems, and even for use with the 5ESS switching system if different reports are of interest to those responsible for developing, installing, operating and maintaining switches, networks, and operating software. One of ordinary skill in the art will appreciate how to modify the preferred embodiment disclosed herein for use with a different switching system or to achieve different development, installation, operating, and maintenance objectives. Parser 144 may be implemented using any suitable parsing technology. In an exemplary embodiment, parser 144 may be implemented using the AWK pattern scanning and processing language. However, parser 144 could be implemented using any other suitable language or program, including, for example, C++, PERL, or Lex.

FIG. 7a depicts two related sample reports 710 and 712 from the report data stream of a 5ESS switching system. FIG. 7b depicts a sample entry 730 from the message file 518 (see FIG. 5; discussed further below) produced by parser 144 as a result of reports 710. FIG. 7c depicts a sample entry 740 from the stack frame file 516 (see FIG. 5; discussed further below) produced by parser 144 as a result of the reports 710 and 712. As best seen in FIG. 7a, the reports include a variety of information, including that identifying the originating switching system, the time and date of the reports, etc. A code 724 is provided to identify the type of report (e.g., "DCF") which the parser uses, in part, to determine whether the particular report is one which should be selected for further processing. In this case, the "DCF" report code is one which the parser does select for further processing. A second code 716 identifies the reason or source of the DCF report. The parser 144 copies these codes to appropriate fields in records 730 and 740.

An event number 714 (e.g., 57918) is assigned by each switching module to allow multiple reports relating to the same event to be associated with one another. Because different switches may assign the same event numbers, the parser assigns a new, unique internal ID number to each event and inserts it in fields 722 of records 730 and 740. Stack frame information 718, which may be present in some, but not all reports, is extracted where available and inserted into a corresponding field 718 of record 740. Other items, such as an identification of the originating switching system, the date and time of a report, and the like, may be copied or translated by the parser into appropriate fields of records 730, 740, using methods known to those of skill in the art.

The parser may also create additional files or records as needed for other functions.

Figure 5:
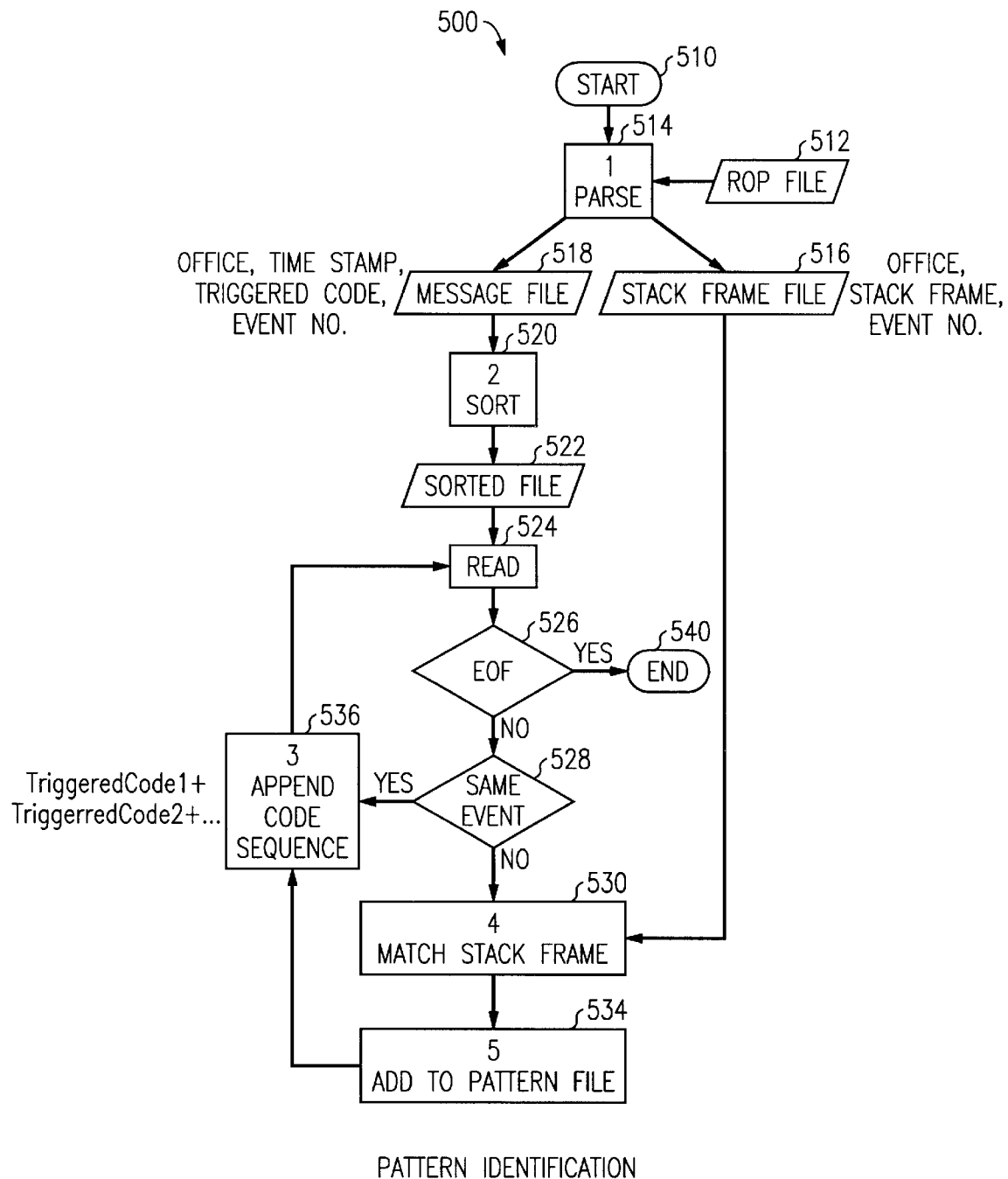
FIG. 5 is a flow diagram showing steps of a method for use with the system of FIG. 1 for identifying patterns of reports contained in switch report data.
Figure 8:
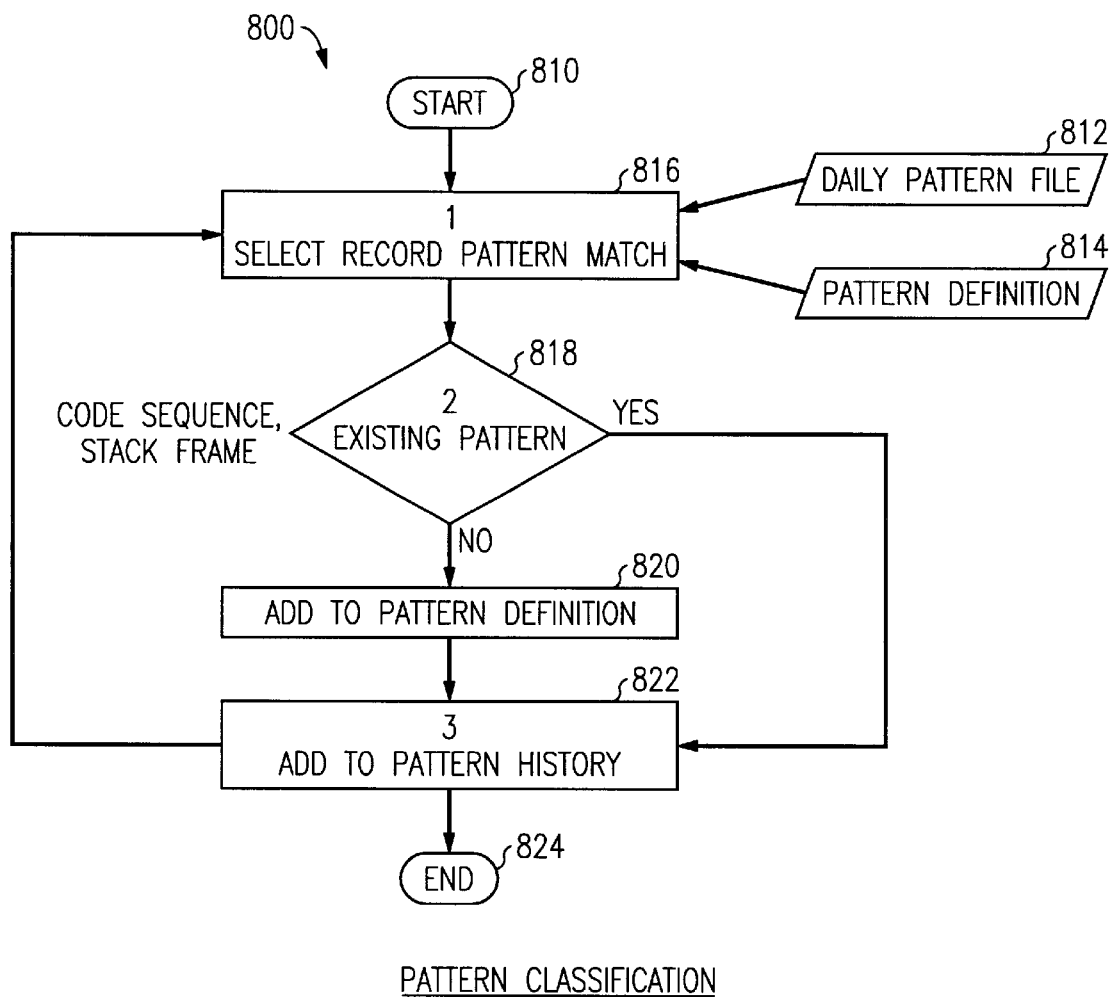
FIG. 8 is a flow diagram showing steps of a method for use with the system of FIG. 1 for classifying patterns of reports contained in switch report data.

Reports which survive the parser 144 are post-processed (see FIGS. 1–3 and 5) by the post-processing facility 146 according to the methods shown in FIG. 5 and FIG. 8. The post-processing facility 146 and associated methods automatically identify patterns of switch report activity, and further classify the patterns into a manageable, actionable list of problems. Optionally, users with subject matter expertise may further classify a group of related patterns as a single problem. This is a significant improvement over prior-art practices of problem identification and resolution using switch report data.

In a pattern identification stage 500, the output files supplied by the parser are processed to identify patterns of reports, as shown in FIG. 5. In an exemplary embodiment constructed according to the present invention, a pattern comprises a list of selected report codes associated with a single event or occurrence, and, where available, the stack frame associated with the triggering report produced from the event or occurrence. Accordingly, the pattern identification stage 500 produces a file of reported event patterns, including a list of report codes in time sequence associated with each reported event (and where available, the stack frame associated with the triggering report produced from the event). This definition of a pattern is appropriate when this preferred embodiment of the invention is used in an exemplary application in conjunction with the aforementioned 5ESS electronic switching system. However, the invention could also be used with other telecommunications switching systems, or with other devices that produce report data streams. One of skill in the art will appreciate that in such other environments, different information could be used to form the patterns, and would appreciate how such information should be selected and parsed.

In a subsequent pattern classification stage 800, each identified event pattern is further analyzed to determine whether the pattern is an "old" pattern (i.e., matches a previously-encountered pattern stored in a pattern database) or a "new" pattern. Thus, the pattern classification stage allows multiple instances of identical event patterns to be grouped together under a single pattern identifier. However, different instances of the same type of event or problem may initially appear unrelated because in each instance, slightly different manifestations of the problem appear in the report data stream, or equivalent manifestations occur but in a different sequence. Thus, at least initially, several different instances of what is essentially the same problem may be assigned different pattern numbers. Accordingly, a facility is provided to allow a user having subject-matter expertise to group together several related pattern identifiers as a "problem."

A switch may report several messages in the report data stream for a single event. All such messages have the same "event number", which is a unique number generated by the switching module. The post-processing facility 146 uses this event number (and certain information identifying the switch module or other internal switch components) to link messages together. The post-processing facility identifies the pattern of an event by comparing selected characteristics of the event, as shown in the report, with the existing patterns in a database 150 (FIGS. 1 and 3). For reports corresponding to most triggers, a "pattern" is defined as the calling function addresses plus the sequence of triggered codes associated with an event. Two events have the same pattern if and only if they have the same calling function addresses and the same sequence of triggered codes. When a new pattern is found, the post-processing facility 146 will assign a unique number (a "pattern number") to the pattern and save it in the database 150. Also, a pattern is classified by the trigger, the first triggered code in the sequence. This classification is used in the display, viewing, and analysis system 160 (discussed further in greater detail) to organize a summary of events. After the post-processing facility 146 identifies and classifies the pattern of an event, the event is recorded into the database 150 under the respective classification. In some cases, the trigger of a pattern may be the second code in a sequence if the first code is not one of the several predefined triggers.

Figure 4:
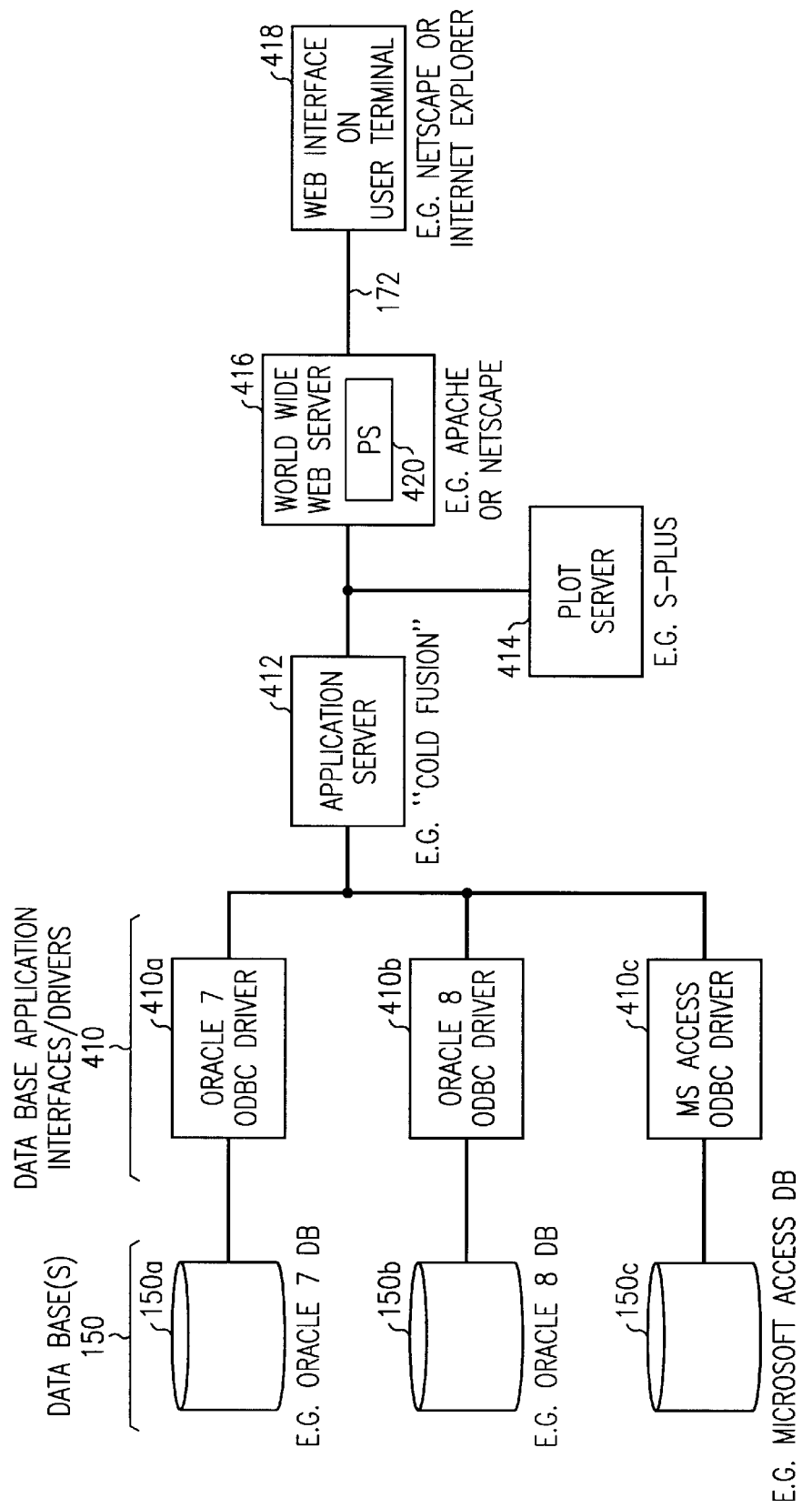
FIG. 4 is a block diagram showing the organization of and flow of information in a data visualization component of the system of FIG. 1.

FIG. 5 is a mixed control and data flow diagram showing a method 500 for use in conjunction with an embodiment of the invention as shown in FIGS. 1, 3, and 4 for identifying patterns of reports contained in switch report data. The method begins at step 510. In step 514, switch report data stream information collected from one or more switches and residing in a ROP file 512 is parsed by parser 144 as described above. The parsing step 514 produces two output files: a message file 518 and a stack frame file 516. The message file 518 includes an entry for each selected report containing: the originating switch or "office" identifier; the report time stamp; the report type code which triggered selection of the report (the "triggered code"), including an whether the report indicated an error or was merely informational; and a unique event number which is generated by the switching system to allow correlation of multiple reports relating to the same event. The stack frame file 516 includes an entry for each selected report for which a stack frame is available containing: the originating switch or office identifier; the stack frame supplied in the report (i.e., the chain of calling function addresses through which the function that produced the report was called); and the switching-system-generated unique event number.

In step 520, the message file 518 is sorted using the originating office, event number, and time stamp as keys, to produce a sorted message file 522. The sorting step is required because the 5ESS switch employs a plurality of processors, some or all running multi-tasking operating systems, and therefore, messages in the report data stream for different events may be interleaved, and messages for a particular event may not appear in the time order in which they were generated. The sorting step groups together all messages from a particular switch and having the same event number in order to facilitate pattern identification.

Step 524 is the first of a sequence of steps 524–536 in which messages are read from the sorted message file to assemble the list of triggered codes and stack frame associated with the event. The list of triggered codes, plus the stack frame if one is available, form the "pattern" of the event. In step 524, a record is read from the sorted message file 522. In step 526, if the end of the sorted message file 522 has been reached, the method jumps to step 540, in which it terminates. If, at step 526, the end of the sorted message file 522 has not been reached, the method continues in step 528. In step 528, the event number of the current record is compared with the event number of the most recent previous record. If the event numbers are the same, then the current record pertains to an event for which earlier records have been processed. The method jumps to step 536, in which the code sequence from the current record is added to a list of code sequences extracted from one or more previously-processed records associated with the same event. Then the method loops back to step 524, in which another record is read. The loop of steps 524, 526, 528, and 536 continues until either the end of the sorted message file 522 is reached or a record is read having an event number different from that of the previously-processed record.

If, in step 528, the event number of the current record differs from the event number of the most recently processed record, the current record corresponds to a "new" event, and the pattern information for the previously-processed event may be written to the pattern file. Accordingly, the method jumps to step 530, in which stack frame file 516 is read to extract stack frame records corresponding to the previously-processed event, if any are available. Then in step 534, the pattern information corresponding to the previously-processed event is written to the pattern file and internal data structures are reinitialized to accommodate information corresponding to the new pattern. The method continues in step 536, in which the code sequence from the current record is appended to the (empty) list of code sequences corresponding to the event from which the current record was generated. Then the method continues with step 524, as before.

The result of the pattern identification method of FIG. 5 is a pattern file containing a single pattern file entry for each event which produced one or more reports that were selected by the parser. Each entry contains the list of report trigger codes and the stack frame associated with the event.

FIG. 8 is a flow diagram showing a method 800 for further analyzing each pattern to determine whether the pattern is an "old" pattern (i.e., matches a previously-encountered pattern stored in a pattern database) or a "new" pattern. The pattern classification method 800 allows multiple instances of identical event patterns to be referenced using a single pattern identifier.

The method 800 starts at step 810. In step 816, a record is selected from the daily pattern file 812 (the output of the pattern identification method 500), and a lookup is performed on pattern definition file 814 to retrieve any record in the pattern definition file 814 having pattern information which identically matches that of the selected record. The pattern definition file 814 contains information regarding all patterns which have been previously encountered by the switch report analysis system 100; thus, the pattern definition file 814 may contain patterns originating from a large number of switches or switch networks. Each pattern definition record includes: a pattern identification code for the associated pattern which uniquely identifies that pattern throughout the system 100; the code sequence containing the list of triggered report codes associated with the event, in time sequence; a stack frame containing the chain of function addresses through which the function generating the report (or in which the error or event originated) was called; and a problem identification code associated with the pattern. Initially, the problem identification code is the same as the pattern identification code, but may be changed if a user associates the pattern with a problem.

In step 818, if a record in the pattern definition file 814 has pattern information which identically matches that of the selected record, the selected pattern record is "old" (i.e., previously encountered), and the pattern need not be added to the pattern definition file. In that case, the pattern identification of the corresponding record in the pattern definition file 814 is associated with the selected pattern record, and the method continues in step 822. However, if no record in the pattern definition file 814 has pattern information which identically matches that of the selected record, the selected pattern record is "new" and the pattern must be added to the pattern definition file. In step 820, a new pattern identification is generated for the selected pattern record, the pattern information from the selected record is added to the pattern definition file under the newly generated pattern identification, and the method continues in step 822.

In step 822, information regarding the event described in the selected pattern file record is saved in an event history file. The event history record includes an identification of the switching office from which the report was generated, a time stamp identifying the date and time of the first message of the event, and the pattern identification newly generated or retrieved from the pattern definition file. If additional records are available in pattern file 812, the method loops back to step 816 to process them. Otherwise, the method ends at step 824.

A "problem" is a set of patterns with a designated primary pattern. Different patterns or reports may appear in the report data stream resulting from the same problem. Different instances of the same type of event or problem may initially appear unrelated because in each instance, slightly different manifestations of the problem appear in the report data stream, or equivalent manifestations occur but in a different sequence. Thus, at least initially, several different instances of what is essentially the same problem would be assigned different pattern numbers. If a user has sufficient subject-matter expertise regarding the switching system, the user may manually reclassify several related patterns as members of a set associated with a particular "problem." The problem is identified by the pattern identifier of a selected pattern in that set. That pattern identifier is referred to as a "primary" pattern identifier. A display component of the system provides graphical user interface (GUI) to allow a user to associate related patterns into a problem.

Although the parser 144 and the post-processing facility 146 are described herein as residing in the central storage and analysis facility 324, 140, 150, one or both of the parser and post-processing facility could also reside in a local spooling server, e.g., 312, 314, and 316, or an aggregation server, e.g., 118, located "closer" to the switches generating the report data. That configuration may be preferable in some cases because then, only the data of interest for analysis need be transferred to the central storage and analysis facility 324, 140, 150 via the data network 320. However, in those cases, facilities must be provided to update and consistently maintain in the remote locations certain information, such as pattern definitions, which is preferably commonly available to analyze the switch report data from all switching systems served by the analysis system 100. Systems and techniques for maintaining databases distributed over plural remote locations are known in the art.

In addition, the description herein of particular processing and user interface functions as occurring in specific physical processor facilities is for the purpose of illustrating an exemplary embodiment of the invention. One of skill in the art will appreciate that any or all of these functions (including but not limited to spooling, storage, analysis, parsing, post-processing, pattern identification, pattern characterization, performance index determination, database, information server, information display, and user interface functions) could be performed on a single computer or distributed over a network of computers, architectures for which are commercially available in great variety. Where not otherwise specified, components shown on the drawings as interconnected may be interconnected or coupled for communication using any suitable physical network, logical network, inter-process communications link, data files, or other facility allowing communications between the components.

The parser 144 and the post processing facility 146 run routinely and insert the processed report data into a database 150 (See FIGS. 1–4 and 6). The database 150 is preferably accessible to suitable applications software 160 (FIG. 1), 412, 414, 416, and 418 (FIG. 4) to display processed switch report data in a form convenient to the user. As best seen in FIG. 4, the database 150 may be implemented using one or more commercially available database management packages, including, but not limited to, ORACLE 150a, 150b or MICROSOFT ACCESS 150c. Because of the large amount of data corresponding to the switch report output of many switches over a long interval of time, databases such as ORACLE, which are explicitly designed for data warehousing applications of large scale, may be more appropriate than other databases.

Figure 2:
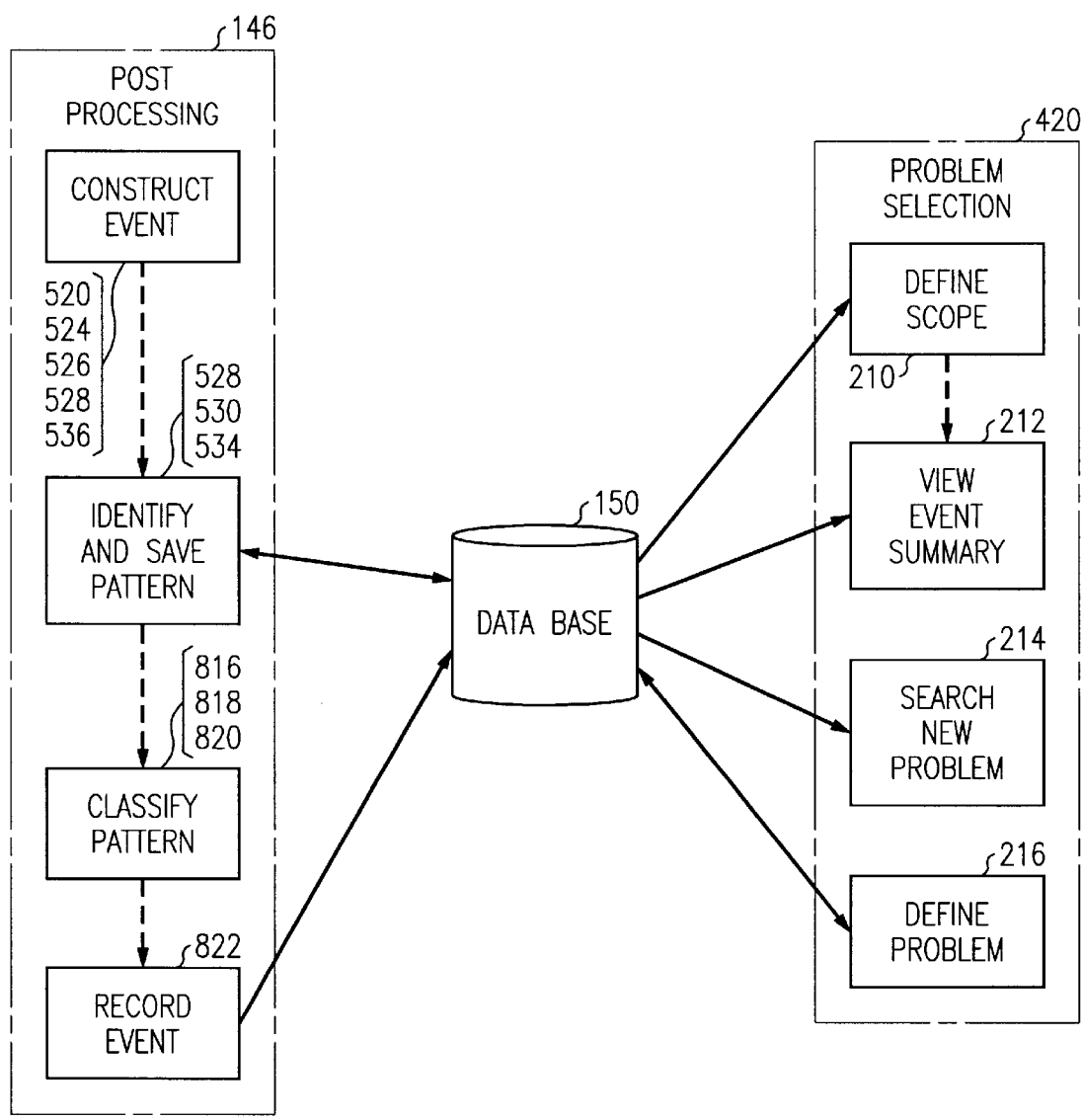
FIG. 2 is a block diagram showing the logical flow of information in post-processing and problem selection components of the system of FIG. 1.

An appropriate data display tool, including components 412, 414, 416, 418, and 420 (FIG. 4) may be used to provide interaction with a user, including the functions shown in the "problem selection" box 420 of FIGS. 2 and 4. For example, the user interaction program preferably provides at least the following functions to view and analyze the collected data:

(a) Define the scope of the data to be viewed or analyzed (see function box 210)—that is, receiving user input specifying which switching offices, which time periods, and which messages should be displayed, etc.;

(b) View a summary of events selected by a trigger, or report code, associated with the event (see function box 212);

(c) View a summary of events selected by a unique problem associated with the event (see function box 212);

(d) Search the database for a "new" problem and view problem history (see function box 214); and (e) Define a problem as a group or collection of related pattern identification codes (see function box 216).

Any suitable user interface program may be used. For example, the FOREST & TREES program, a commercially available data visualization package, could be used to directly access the database 150 and allow the user to perform the functions 210, 212, 214, and 216 above.

However, in a preferred embodiment of the invention, the services of the viewing and analysis system 160 are delivered via a standard interface, such as the World Wide Web (and associated languages and protocols), so that "special" software need not be required on the user's workstation. As best seen in FIG. 4, appropriately selected ODBC drivers 410a, 410b, and 410c provide an interface between the databases 150a, 150b, and 150c respectively, in which the switch report data is stored, and a suitable application server package 412. Alternate facilities for providing access to the database 150 by external programs could also be used. Any suitable application server 412 may be used to receive user-entered requests for information, query the database 150 for the required information, and supply the results as appropriately formatted "web" pages. For example, the COLD FUSION program, a "middleware" application server product commercially available from ALLAIRE Corp., One Alewife Center, Cambridge, Massachusetts, could be used. A suitable web server program 416 is preferably provided to receive user input requests, forward them to the application server 412, and serve the results from the application server 412 to the user workstation 310 (FIG. 3). For example, many web server programs are available (including NETSCAPE and APACHE) from commercial or other sources. As is well known in the art, the user may use a conventional web browser 418 on workstation 310 and any suitable network connection 172 to access the web server 416. As best seen in FIG. 4, a suitable statistical and plotting application 414 may be used to perform statistical analyses on the processed data. For example, the S-PLUS package, which is available from MathSoft, Inc., Data Analysis Products Div., 1700 Westlake Ave N, #500, Seattle, Wash., may be used.

FIGS. 6a, 6c, 6e–6h, 6j–6n, and 6q–6r, and 6t–6y are tables showing record layouts for constructing a suitable database as shown in FIGS. 1–4, for storing processed switch report data and delivering selected data to the user interface application. Although not shown for table structures in FIG. 6, it should be noted that each record in each table has a corresponding primary key which uniquely identifies the record.

FIG. 6a shows the layout of a Code Definition table 610 used to map between assert numbers and associated descriptive names or mnemonics. The Code Definition table 610 could be split into several tables, each mapping assert numbers to a respective individual series of descriptive names or mnemonics, for improved performance.

FIG. 6c shows the layout of an Event Code Summary table 614 used to hold a summary count of each type of report item at each switching office for a particular date.

FIG. 6e shows the layout of an Event Pattern Detail table 616 used to contain the details extracted from the report for each instance of each trigger found in the report data.

FIG. 6f shows the layout of an Event Pattern Summary table 618 used to hold a summary count of each type of trigger observed at each switching office for a particular date.

FIG. 6g shows the layout of a Location table 620 used to describe identifying information for each switching office. The Location table 620 may also include a field (not shown) to hold an externally-recognized identification code for each switching office.

FIG. 6h shows the layout of a Location Map table 622 used to map between internal switching office identification numbers and switching office names.

FIG. 6j shows the layout of a Message Group table 624 used to map between a code identifying one of several possible user communities and a description of that user community.

FIG. 6k shows the layout of a Message Group Type table 626 used to identify the groups of report types which are of interest to each user community.

FIG. 6l shows the layout of a Message Type table 628 used to map between an internal numeric identifier for each report type and a description of that report type. Table 628 is also used to map between an internal numeric identifier for each switch performance index and a description of that index.

FIG. 6m shows the layout of a Normality table 630 used to record different categories of call volume measurements, for each switch, for each day.

FIG. 6n shows the layout of an Office Software Update table 632 used to record information about the version of system software used in each switching office and date information indicating when that version of system software was applied. This table contains a minor or less significant portion of the version information. An additional table (not shown) may be provided to contain the major or more significant portion of the version information.

FIG. 6q shows the layout of a Pattern Code table 636 used to map between an internal pattern identification code and information describing the trigger codes (and other report codes) associated with the pattern. This table includes a separate record for each trigger code (and other report codes) associated with the pattern.

FIG. 6r shows the layout of a Pattern History table 638 used to identify by time and date, for every switching office, the first occurrence of a particular pattern.

FIG. 6t shows the layout of a Report Average table 642 used to store certain historical average values of switch performance indices for each switch, for each hour, for each day of the week. This table allows comparison of a switch performance index for a particular hour of the day with a historical average value taken during the same hour of the same day of the week, spanning a predefined period, such as three months.

FIG. 6u shows the layout of a Report Detail table 644 used to contain detailed traffic information for each switch, for each day.

FIG. 6v shows the layout of a Report Summary table 646 used to contain daily aggregate traffic information for each switch, for each day.

FIG. 6w shows the layout of a ROP (Switch Report Data Stream) Information table 648. For each report data stream file received, this table contains summaries of the numbers of types of reports that were successfully parsed, and among successfully parsed reports, how many were successfully imported into the database.

FIG. 6x shows the layout of a ROP Scope table 650 used to contain, for each switching office, for each day, an indication of the start time, end time, and number of hours of contiguous switch report data received, measured in hours. If multiple report data streams exist, or if any report data stream includes report data non-contiguous in time, a record will be present in this table for each file or period of contiguous data.

FIG. 6y shows the layout of a Switch Index table 652 used to contain switching system performance indices for each switching office, for each day, for each type of index. An additional ROP Status table (not shown) may be provided to maintain the status of processing of each report data file as it is received, parsed, post-processed, and imported into the database.

The text files produced by the post-processing function (see FIGS. 5 and 8) are imported into the database using standard techniques. As the data are imported, certain summary information is pre-calculated to enable rapid display of that information. In particular, summary information for each day of switch report data (across all switches), and summary information for each switch (across a predetermined time period) are calculated in advance and stored in the database. Summaries for levels above individual switches or offices, or above individual days, are prepared upon request on an "on the fly" basis, but the pre-calculation of summaries at the underlying levels enables the upper level summaries to be displayed relatively quickly. In addition, a pattern history table is created upon import of report data into the database, for display to the user.

Also at the time report data is imported into the database 150, several switch performance indices are determined for each switch. The performance indices are determined and the results stored corresponding to the period covered by the switch report data stream files supplied to the parser. Typically, these files cover a 24-hour period. If a user requests a report of switch performance indices covering a different period, the data display and analysis software may determine the indices by aggregating or averaging the daily values which were previously determined and stored at the time the data was imported into the database. Although in a preferred embodiment of the invention, the switch report indices are determined at the time post-processed data is imported into database 150, such indices could also be separately determined before import, after import (e.g., by a program that retrieves appropriate underlying data from the database, performs the index determination, and writes the results back to appropriate database records), or by information server, information display, or user interface components of the viewing and analysis facility 160. Preferably, the following performance indices are provided, in accord with known practice in the telecommunications industry: Call Processing Effectiveness; Switch Network Performance; Call Processing Stability; Software Stability; Hardware Stability; and Switch Outage.

In addition, an Operational Risk (OR) index, which measures the risk of being unable to provide services from a switch, may also be provided. The OR index differs from the other aforementioned switch performance indices in that it is believed to be valuable in predicting the future reliability of a switch based on current performance. The OR index is calculated as a scaling factor of 0.10 times the sum of the following values obtained from the switch report data stream:

(a) The total number of off-normal conditions (obtained from the OFNRM conditions report);

(b) The total number of incomplete routine exercises in the Administrative Module (AM) (obtained from the Routine Exercise summary report);

(c) 0.001 times the total number of incomplete routine exercises in all Switching Modules (SMs) (obtained from the Routine Exercise Diagnostics and Fabric report);

(d) The total number of processor overload occurrences (from the Overload status report);

(e) The total number of route overload occurrences (from the Route Overload report); and (f) The total number of route blockage occurrences (from the Route Blockage report).

The scaling factor is used to scale the result to an appropriate range; a different scaling factor could also be used. The particular parameters used to determine the OR index are believed to provide meaningful results in conjunction with the 5ESS switching system and rely on reports available in that switching system's report data stream. Although other switching systems may not produce identical reports, it is believed that other commercially available switching systems provide in their report data streams similar information which may be useful in determining an Operational Risk index having predictive value. One of skill in the art will appreciate how to modify the method of determining the OR index described herein to accommodate the information provided by other switching systems without departing from the spirit of the present invention.

The above-described embodiment of the invention is merely one example of a way in which the invention may be carried out. Other ways may also be possible and are within the scope of the following claims defining the invention.

What is claimed is:

1. A system for analyzing telecommunications switch report data, said switch report data including switch report items, comprising:

a storage facility for receiving and storing a plurality of telecommunications switch report items;

a parser coupled to the storage facility said parser receiving said report items from said storage facility and selecting for processing report items matching report criteria;

a post processor responsive to said report items selected by said parser to identify at least one pattern associated with each of said report items;

a database coupled to the post processor, said database receiving and storing information derived from said report items and said at least one pattern associated with each of said report items; and a user interface coupled to said database for displaying user-selected information from said database.

2. The system of claim 1 wherein said storage facility comprises a computer operatively connected to at least one telecommunications switching system, said computer having non-volatile storage for receiving and storing telecommunications switch report items from said telecommunications switching system.

3. The system of claim 1 wherein:

and parser has a predetermined list of report codes to be selected for further processing;

each of said report items includes an item report code; and for each of said report items said parser comparing said item report code with said predetermined list of report codes and selecting said report item for further processing if said item report code is on said list.

4. The system of claim 1 wherein said post processor comprises:

a pattern identification component coupled to said parser to receive said selected report items and extract pattern information therefrom; and a pattern classification component coupled to said pattern identification component to receive said pattern information and for each report item classify such pattern information to form a list of unique patterns.

5. The system of claim 1 further comprising:

a facility responsive to report items selected by said parser to determine at least one index of switch performance.

6. The system of claim 5 wherein said facility responsive to report items selected by said parser to determine at least one index of switch performance determines a switch operational risk index.

7. A system for analyzing report information, including report items, comprising:

a storage facility for receiving and storing a plurality of report items;

a parser responsive to said report items in said storage facility to select for processing report items matching report criteria;

a post processor responsive to each of said report items selected by said parser to identify at least one pattern associated with such item;

a database receiving and storing information derived from said report items selected by said parser and information derived from said at least one pattern associated with each of said report items; and a user interface coupled to said database for displaying information from said database in accord with user selection.

8. A method for analyzing telecommunications switch report items comprising the step of:

receiving switch report items from at least one telecommunications switch;

extracting from at least some report items, pattern information associated with said report items; and classifying said pattern information to produce a list of unique patterns among said switch report items.

9. The method of claim 8 further comprising the step of:

displaying responsive to user selection at least one of said report items along with said pattern information respectively associated with said report items.

10. The method of claim 8 wherein said classifying step further comprises the step of:

associating with each of said report items an identification of a unique pattern corresponding to said pattern information extracted from said report item.

11. The method of claim 10 further comprising the step of:

storing in a database information derived from said report items including for each of said report items said identification of a unique pattern.

12. The method of claim 8 wherein said receiving step thereof further comprises the step of:

storing said switch report items in a local spooling facility.

13. The method of claim 8 wherein said receiving step thereof further comprises the step of:

receiving switch report items from a plurality of telecommunications switches and storing said switch report items in a local spooling facility.

14. The method of claim 8 wherein said receiving step thereof further comprises the steps of:

receiving switch report items from a first plurality of telecommunications switches and storing said switch report items in a first local spooling facility;

receiving switch report items from a second plurality of telecommunications switches and storing said switch report items in a second local spooling facility; and receiving switch report items from said first and second local spooling facilities and storing said switch items in a centralized storage facility.

15. The method of claim 8 wherein said extracting step thereof further comprises the steps of:

for each of said switch report items, determining a type of said switch report item;

comparing said type with a predetermined list of report types of interest; and selecting said switch report item for further processing if said type appears on said predetermined list of report types of interest.

16. The method of claim 8 wherein said extracting step thereof further comprises the steps of:

examining a plurality of said switch report items in turn, and for each:

determining a report type code associated with said switch report item; and reporting as pattern information associated with said switch report item said report type code.

17. The method of claim 8 wherein said extracting step thereof further comprises the steps of:

examining a plurality of said switch report items in turn, and for each:

extracting if available stack frame information associated with said switch report item; and reporting as pattern information associated with said switch report item said stack frame information.

18. The method of claim 8 wherein said extracting step thereof further comprises the steps of:

examining a plurality of said switch report items in turn to determine for each an identification of corresponding event; and for each of said events identified in said examining step:

forming a list of report type codes associated with each of said switch report items corresponding to such event;

reporting as pattern information associated with such event said list of report type codes.

19. The method of claim 8 wherein said extracting step thereof further comprises the steps of:

examining a plurality of said switch report items in turn to determine for each an identification of corresponding event; and for each of said events identified in said examining step:

forming a list of available stack frame information associated with each of said switch report items corresponding to such event;

reporting as pattern information associated with such event said list of stack frame information.

20. The method of claim 8 wherein said classifying step thereof further comprises the steps of:

examining pattern information produced in said extracting step and for each pattern in turn:

comparing such pattern to a list of known patterns and corresponding pattern identification codes; and if said pattern matches a known pattern on said list, associating said pattern with said pattern identification code corresponding to said matched known pattern.

21. The method of claim 8 wherein said classifying step thereof further comprises the steps of:

examining pattern information produced in said extracting step and for each pattern in turn:

comparing such pattern to a list of known patterns and corresponding pattern identification codes; and if said pattern does not match a known pattern on said list, creating a pattern identification code corresponding to said pattern and adding said pattern and said pattern identification code to said list.

22. The method of claim 8 further comprising the step of:

determining from said switch report items and with respect to at least one switch an index of switch performance.

23. The method of claim 8 further comprising the step of:

determining from said switch report items and with respect to at least one switch an Operational Risk (OR) index of switch performance, said index measuring a risk of being unable to provide services from said switch.

24. The method of claim 23 wherein said determining step (d) further comprises the step of:

determining said Operational Risk index as 0.1 times the sum of:

a total number of off-normal conditions;

a total number of incomplete routine exercises in an administrative module;

0.001 times a total number of incomplete routine exercises in all Switching Modules;

a total number of processor overload occurrences;

a total number of route overload occurrences; and a total number of route blockage occurrences;

over a predetermined period.

* * * * *